Figure 1:
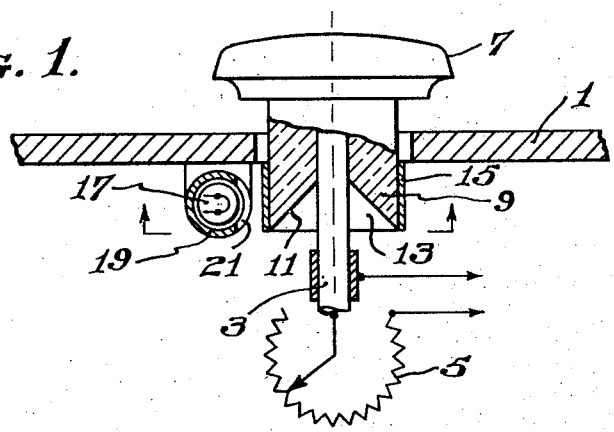

Nov. 16, 1943.    F. L. CREAGER    2,334,479

TELL-TALE DEVICE

Filed Oct. 31, 1940

Inventor
Frederick L. Creager
By
Attorney

Patented Nov. 16, 1943

2,334,479

UNITED STATES PATENT OFFICE 2,334,479

TELLTALE DEVICE

Frederick L. Creager, Camden, N. J., assignor to Radio Corporation of America, a corporation of Delaware Application October 31, 1940, Serial No. 363,794

2 Claims. (Cl. 116—124.4)

This invention relates to tell-tale devices for producing a visual indication of the operating condition of electrical or other apparatus.

While the invention will be described as embodied in a control knob for a radio receiver, it is to be understood that the disclosure in this respect is merely illustrative for purposes of explaining the inventive concept.

It has previously been proposed to incorporate a "bull's eye" and a light bulb in a control knob for indicating the operating condition of the electrical or other equipment controlled by the knob. The principal objection to tell-tale devices of this general type is that they provide an "on-off" indication only and cannot indicate the exact operating condition of apparatus embodying a variable control system or one operable in several discrete steps over a desired range. Telltale knobs capable of producing indications individual to several different operating conditions have heretofore been proposed, but such indicators require a hollow shaft with the light source and a color wheel therefor mounted adjacent the inner end of the shaft which, for this reason, must operate indirectly as through gears to actuate the rheostat, switch, or other control device.

Accordingly, the principal object of the present invention is to provide a simple, inexpensive, trouble-free, tell-tale control device which may be coupled directly to the control apparatus and which shall produce an accurate visual indication of the instantaneous operating condition of said apparatus substantially irrespective of its operating range.

A related object of the invention is to provide a tell-tale device comprising an illuminated control knob and a fixed source of light disposed out of the way of the control shaft and the units associated therewith, whereby a compact assembly is achieved without danger of excessive heating of the knob and without the use of slack in the wiring system.

The foregoing and other objects are achieved in accordance with the invention by providing a translucent knob or other control element having a hub or extension of novel configuration and constituted, preferably, of a substance having light transmissive properties equivalent to that of natural quartz. "Lucite" and "Crystallite" (polymerized methyl methacrylate resins) have the requisite optical properties and are to be preferred because they are comparatively cheap and can be worked more easily than quartz. A fixed source of light, which may conveniently be mounted to one side of the hub, projects its rays on the hub and, because of the configuration and optical properties of this part, the said rays are "picked up," "bent" or reflected, and then transmitted through the hub to the translucent knob. A color screen which may comprise a colored surface portion of the hub is incorporated in the device so that a variable tell-tale indication is produced adjacent the leading end of the knob as the hub is rotated on its axis and with respect to the fixed source of light.

Figure 2:
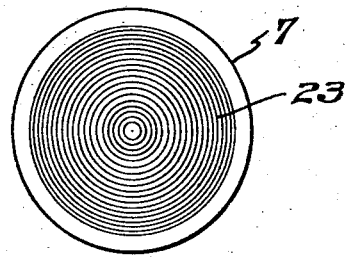
Figure 3:
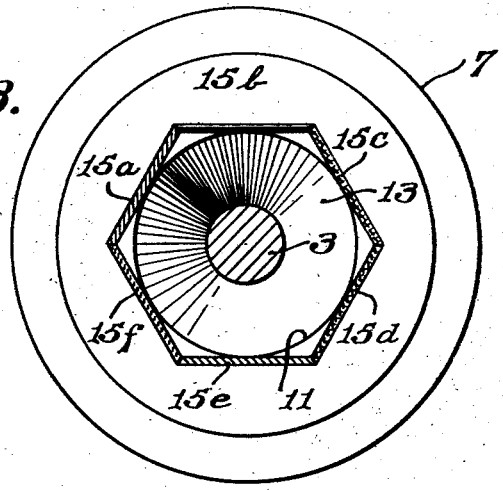

Certain details of construction together with other objects and advantages will be apparent and the invention itself will be best understood by reference to the following specification and to the accompanying drawing, wherein:

Figure 1 is a sectional view, partly diagrammatic, of an illuminated tell-tale control device embodying the invention, Figure 2 is a front plan view of the knob of Fig. 1, and Figure 3 is an enlarged sectional view taken on the line 3—3 of Fig. 1.

In the drawing 1 designates a control panel of a radio apparatus having a rotatable shaft 3 for regulating the setting of one or more control units 5 which will be understood to govern the operation or performance of the set. The part or unit controlled by the rotatable shaft 3 could, of course, comprise a step-by-step switch (such as an "on-off" switch or a multi-position band-change switch) instead of the continuously variable rheostat 5 here illustrated.

Affixed to the free end of the shaft 3, as by a force fit or otherwise, is a translucent control knob 7 having an inwardly extending hollow hub 9 within the bore of which the shaft end is seated. As previously indicated, the knob 7 and the hub 9 are preferably formed of a material possessing optical properties similar to that of natural quartz and may comprise an integral or a composite structure formed of "Lucite," "Crystallite" or similar synthetic resinous material.

In accordance with the invention the translucent hollow hub 9 is provided on its inner end with a counter-sink 11 the preferably conical surface 13 of which may intersect the surface of the shaft 3 at an angle of, say, 45°. The outer surface of the translucent hub 9 is provided with a color screen 15 which, as shown in Fig. 3, may be in the form of hexagonal or other plural sided translucent shell or sleeve fitted over the countersunk end of the hub and having different colored surfaces 15a, 15b, etc., each individual to a different angular range of movement of the control shaft 3. Alternatively, the color screen 15 may comprise a translucent coating applied directly to the outer surface of the hub. Irrespective of its method of attachment the color screen 15 may comprise either a series of discrete contrasting segments or a continuous spectrum.

A lamp 17 is mounted to one side of the translucent hub 9, as on the rear surface of the panel 1, in a fixed position calculated to cause its rays to impinge the translucent color screen 15 which, as previously set forth, surrounds the conical or other surface 13 of the counter-sink 11. A reflector 19 having an aperture 21 may be employed for concentrating the light from the lamp 17 upon the adjacent segment or section of the color screen 15. Light rays entering the translucent hub 9 through the color screen 15 are "bent" or have their direction altered as they approach the surface of the counter-sink and are directed through the hub to the translucent control knob 7 which latter part thus assumes the color of that portion of the screen 15 which, at the moment, is in register with the reflector aperture 21. Thus, as the knob 7 and its hub 9 and shaft 3 are rotated over the operating range of the control device 5 the knob is illuminated in different colors each individual to a particular operating condition of the radio or other apparatus of which the unit 5 is a part.

In order to conceal the end of the shaft 3 from the view of an observer looking into the translucent control knob 7, the front surface of the knob is preferably provided with a series of concentric grooves 23 (Fig. 2) which operate to diffuse or to spread the light, transmitted through the hub, uniformly throughout the knob.

What is claimed is:

1. A tell-tale control device comprising a translucent knob having an integral translucent hub constituted of polymerized methyl methacrylate resin, said hub having a counter-sunk surface for directing light picked up by the outer surface of said hub in the direction of said translucent knob.

2. A device of the character described comprising a control shaft, a translucent control member connected therewith, a translucent hub on said control member and having a counter-sink within which said shaft is received, a source of light directed upon the outer surface of said hub, means within said hub and comprising the surface of said counter-sink for directing said light to said translucent control member, and means comprising corrugations on the leading end of said control member for diffusing the light transmitted to said control member whereby said control shaft is rendered invisible to an observer looking into said translucent control member.

FREDERICK L. CREAGER.